E. A. HOLLENBECK & W. G. HUFF.
STORAGE PIT.
APPLICATION FILED MAY 21, 1915.
1,209,297.
Patented Dec. 19, 1916.
2 SHEETS—SHEET 1.
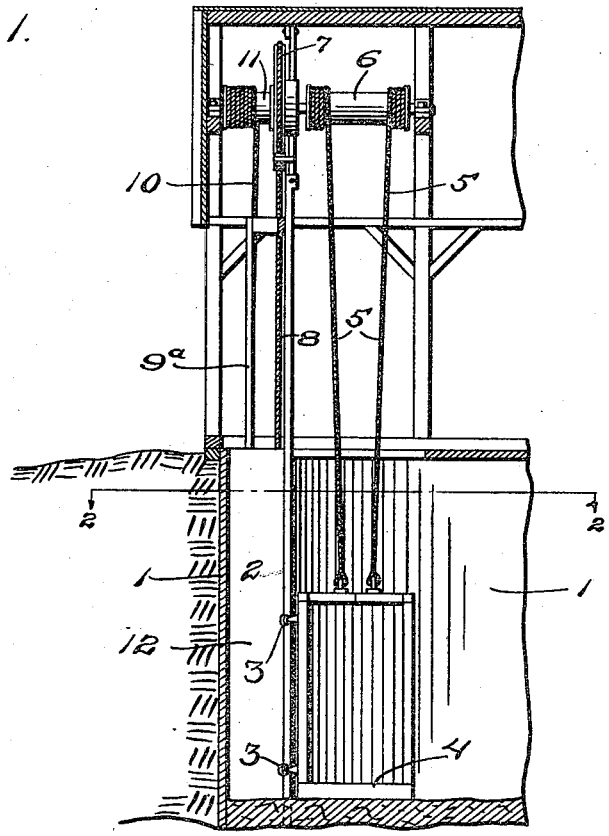
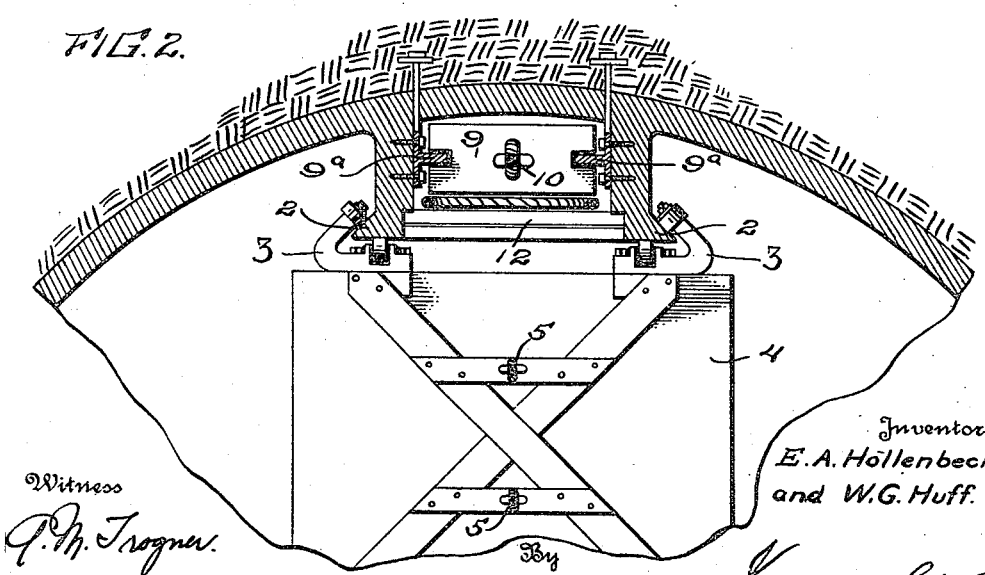
Witness
J. M. Trogner.
Inventor
E. A. Hollenbeck
and W. G. Huff.
By
Knight Bro.
Attorneys.

E. A. HOLLENBECK & W. G. HUFF.
STORAGE PIT.
APPLICATION FILED MAY 21, 1915.
1,209,297.
Patented Dec. 19, 1916.
2 SHEETS—SHEET 2.
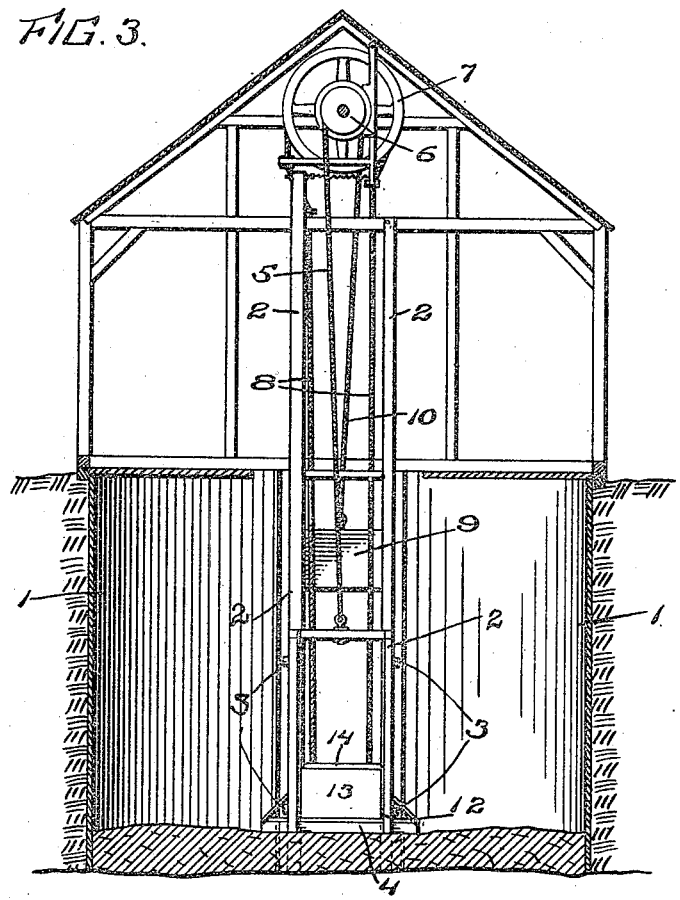
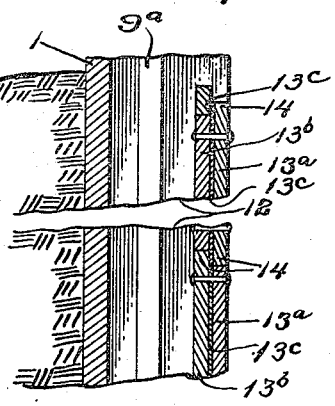
Inventors,
E. A. Hollenbeck,
and W. G. Huff,
By Knight Bros
Attorneys

UNITED STATES PATENT OFFICE.

ELIJAH A. HOLLENBECK AND WILBERT G. HUFF, OF HOLDREGE, NEBRASKA.

STORAGE-PIT.

1,209,297.  Specification of Letters Patent.  Patented Dec. 19, 1916.

Application filed May 21, 1915. Serial No. 29,625.

*To all whom it may concern:*

Be it known that we, ELIJAH A. HOLLENBECK and WILBERT G. HUFF, citizens of the United States, both residing at Holdrege, in the county of Phelps and State of Nebraska, have invented certain new and useful Improvements in Storage-Pits, of which the following is a specification.

This invention relates to pits for storing silage, ice or other substances which involve the use of an air-tight storage chamber and necessitate elevator-delivery at the upper end, in consequence of their location partly or wholly below the surface of the ground, or for the sake of maintaining air-tight walls.

The invention relates particularly to a housing which incloses the counter-balance weights of the elevator, as well as the hand rope through which to drive the overhead winding drum or otherwise control the means employed for raising and lowering the elevator, which housing will preferably have provided upon its exterior, guides or tracks for the elevator cage.

The object of the invention is to so construct this housing that it will extend to the bottom of the pit and can be opened up from the top downward, in sections, without interfering with the cage guides and give access to the hand rope down to any level to which the elevator may have to descend, as the contents of the pit is gradually used up, and which housing will be air-tight throughout all closed portions thereof, and thus prevent access of air that would support fermentation of silage or otherwise attack the stored material, such as melting stored ice, at any point below the top level of the material.

The invention will be fully understood upon reference to the accompanying drawings, in which—

Figure 1 is a vertical section of a pit to which the present invention is applied, showing the elevator, the guide track, the housing for the counter-weight and hand rope, and the operating mechanism, all in elevation. Fig. 2 is a horizontal section on the line 2—2 of Fig. 1. Fig. 3 is a vertical section in a plane at right angles to the plane of Fig. 1, and Fig. 4 is a detail view, on an enlarged scale, showing the construction of the closure sections or doors.

1 represents a pit, from which it is desired to deliver the contents at the upper end, either because of the location of the pit wholly or partially below the surface of the ground, or because of other considerations, which make it desirable to have solid air-tight walls, and an elevated delivery. Located on the outside wall of the pit are elevator tracks 2, receiving the guide shoes 3 of an elevator cage 4, which is suspended through means of two ropes or other flexible winding connections 5 from a winding drum 6, under control of a sheave or pulley 7 over which runs the endless hand rope 8 that hangs down within reach of a person standing on the elevator, whatever the position of the elevator may be; said winding drum 6 also being under the influence of a counterweight 9 mounted between guides 9ª, and connected by a rope 10 with the drum 11, upon which the rope is wound in a direction opposite to the winding of the suspending rope 5, so that as one of the ropes 5 and 10 is wound, the other is unwound, and vice versa.

The parts thus far described involve the application to a pit, of a hand-operated elevator that can be bought in the open market; but such an application involves serious difficulties, inasmuch as the provision of a well for the counter-weight and hand rope, would, if left open, afford destructive access of air to the entire column of material stored, whereas if the well is built up tight without any communication with the pit, the hand rope is not accessible. Moreover, it is desirable to have the counter-balance-well accessible throughout its length, for cleaning, etc. The present invention overcomes these difficulties and in short renders possible the application of an elevator to a storage pit, by providing a housing 12 for the counter-balance and hand rope, which is always air-tight to a point at least as high as the top of the material stored, so as to prevent circulation, through the material, of air that would support fermentation or induce melting, but which has at least one of its walls, preferably the one toward the elevator, built up of removable sections 13 that are jointed to the housing and to each other, as for instance by overlapping flanges or rabbets 14 (as shown in Fig. 4), and with or without suitable packing material to render the joints substantially air-tight; these conditions being embodied in sections or doors which are readily removable or replaceable at will, and the well being thus adapted to permit operation of the counter-balance and hand rope all the way to the bottom of the pit. The doors 13 are made up of suitably riveted or otherwise united plates $13^a$, $13^b$, with interposed felt or other packing $13^c$, which extends outward to form facings over the rabbets 14.

The tracks 2 that receive the guide shoes 3 are on the outside of the well or housing 12. The elevator cage can descend below the upper end of a door 13 and thus leave the latter in place until the level of stored material gets well below its lower end, while always permitting the elevator to descend to the surface of the material. The shoes 3 are located at suitable points to steady the cage, as shown in Figs. 1 and 3. It will never be necessary to remove more door sections than will expose the operating rope 8 to the reach of the operator standing on the cage platform. With this arrangement, the elevator can always be lowered until arrested by the top level of the material stored, which is quite convenient when permitting the cage to descend by gravity and under control of the usual brake applied to the hoisting mechanism.

We claim:—

1. The combination with a storage pit, a vertically disposed elevator track, a housing adjacent thereto, providing a well, a counter-balance adapted to operate vertically in said well, a control rope depending in said well, an elevator cage mounted to engage with and travel upon the track, and hoisting mechanism located above the well and cage; the wall of the well presented toward the cage being constructed of separately removable and replaceable sections.

2. In combination with a storage pit, a vertically disposed elevator track, a housing adjacent thereto, providing a well, a counter-balance adapted to operate vertically in said well, a control rope depending in said well, an elevator cage mounted to engage with and travel upon the track, and hoisting mechanism located above the well and cage; the wall of the well presented toward the cage being constructed of separately removable and replaceable sections; the track for the elevator cage being mounted on the outside of said housing, and its floor being adapted to descend below the upper edges of the wall sections when in place.

The foregoing specification signed at Holdrege, Nebraska, this 18th day of May, 1915.

ELIJAH A. HOLLENBECK.
WILBERT G. HUFF.